(12) United States Patent
Hasegawa et al.

(10) Patent No.: US 9,952,770 B2
(45) Date of Patent: Apr. 24, 2018

(54) RESPONDING TO RECALL OPERATIONS BASED ON FILE MIGRATION TIME

(71) Applicant: International Business Machines Corporation, Armonk, NY (US)

(72) Inventors: Tohru Hasegawa, Tokyo (JP); Masayuki Iwanaga, Urayasu (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/181,530

(22) Filed: Jun. 14, 2016

(65) Prior Publication Data

US 2017/0357451 A1    Dec. 14, 2017

(51) Int. Cl.
  *G06F 12/00*    (2006.01)
  *G06F 3/06*    (2006.01)
(52) U.S. Cl.
  CPC ............ *G06F 3/0605* (2013.01); *G06F 3/067* (2013.01); *G06F 3/0611* (2013.01); *G06F 3/0647* (2013.01); *G06F 3/0659* (2013.01)

(58) Field of Classification Search
  None
  See application file for complete search history.

(56) References Cited

U.S. PATENT DOCUMENTS

| 8,862,815 B2 | 10/2014 | Eleftheriou et al. |
| 2013/0024436 A1 | 1/2013 | Erofeev |
| 2015/0113216 A1 | 4/2015 | Butt et al. |
| 2015/0160865 A1 | 6/2015 | Hasegawa et al. |

FOREIGN PATENT DOCUMENTS

KR    1020110066140 A    6/2011

*Primary Examiner* — Baboucarr Faal
(74) *Attorney, Agent, or Firm* — Alexa L. Ashworth; A. Imtiaz Billah

(57) ABSTRACT

Embodiments of the present invention provide methods, systems, and computer program products for responding to recall operations based on a file migration time. In one embodiment, it is determined whether the number of recall requests (R) is equal to the number of storage drives in an idle state, and if the number of recall requests (R) is equal to the number of storage drives in an idle state, the storage drive(s) that are in the idle state are assigned as having the shortest time to complete a requested recall operation. The time to complete the requested recall operation (M) of the identified idle state storage drive(s) is set to zero.

20 Claims, 4 Drawing Sheets

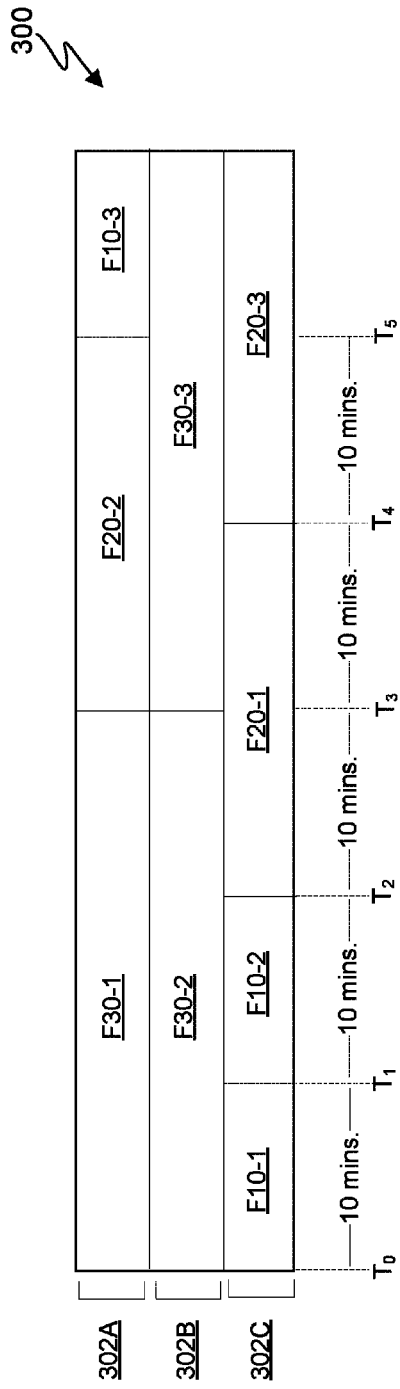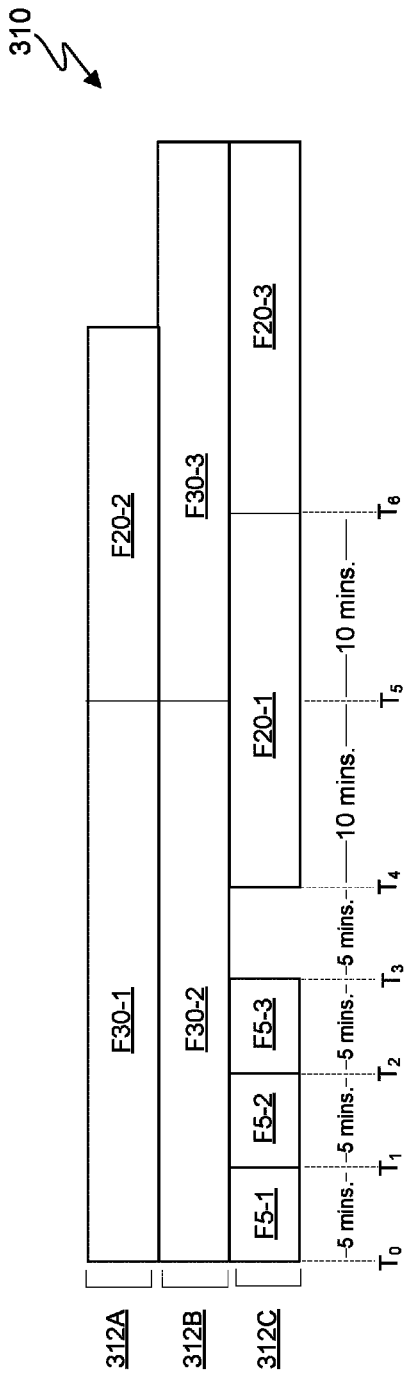

RESPONDING TO RECALL OPERATIONS BASED ON FILE MIGRATION TIME

BACKGROUND OF THE INVENTION

The present invention relates generally to the field of data storage systems, and more particularly to allocating migration files in hierarchical storage systems, such that a recall operation can be started within a predetermined time from which a recall request is received.

In a hierarchical storage management system, data is stored in different types of storage devices depending upon the frequency of usage of the data. For example, a system may include multiple storage media types to store data having different usage patterns and likelihoods of access. More frequently used data may be stored on direct access storage devices (DASD) comprising high-performance rapid access storage devices, such as hard disk drives. Less frequently used data may be archived on slower and less expensive, demountable storage media, such as optical disks and magnetic tape cartridges.

Two common functions initiated by host systems in hierarchical storage management systems include migration and recall. Migration typically involves the movement of data from a rapid access storage device, such as a hard disk drive, to a slower access storage device, such as a tape medium. A recall operation generally involves data transfer in the opposite direction (i.e., from a tape medium to a rapid access storage device).

SUMMARY

Embodiments of the present invention provide methods, systems, and computer program products for responding to recall operations based on a file migration time. In one embodiment, one or more computer processors, receive a recall request (R), wherein R is greater than or equal to one. One or more computer processors determine whether a number of recall requests (R) is less than a number of storage drives that are in an idle state. One or more computer processors, responsive to determining that the number of recall requests (R) is not less than the number of storage drives that are in the idle state, determine whether the number of storage drives that are in the idle state is equal to the number of recall requests (R). One or more computer processors, responsive to determining that the number of storage drives that are in the idle state is equal to the number of recall requests (R), identify a storage drive that is in the idle state as the storage drive comprising a shortest time to complete a requested recall operation and setting a time to complete the requested recall operation (M) of the identified storage drive to zero.

BRIEF DESCRIPTION OF THE DRAWINGS

FIG. 3A depicts a schematic representation of the order of files to be migrated by the tape drives, in accordance with an embodiment of the present invention;

FIG. 3B depicts a schematic representation of the order of files to be migrated by the tape drives, in accordance with another embodiment of the present invention.

DETAILED DESCRIPTION

With respect to recall operations in hierarchical storage management systems, the time taken to recall a file from the mount point of the respective tape is important. The time to locate a requested data record may be influenced by the length of tape medium, the reposition velocity, the physical position of the requested data sets on the tape media, etc. Additionally, a tape drive may not know, with certainty, the actual physical position of the target data files on the tape medium, which may lead to longer than desired elapsed times.

Embodiments of the present invention recognize that the time that elapses to recall a file from a lower storage tier to a higher storage tier in a hierarchical storage management system may be influenced and/or longer than desired, due to the difference in data rates associated with a host reading data from a tape drive, verses a tape drive reading data from a tape medium.

In general, the priority of recall operations is higher than that of migration operations. This is because a user operation for writing data ends at the time when the data has been recorded to the hard disk drive, so that the required time for the migration operation does not affect the required time for the user to write the data. Conversely, during the user operation for reading data, the time required for a recall operation directly affects the required time for the user to read the data (i.e., the user cannot read the data, until the recall operation has been performed). Embodiments of the present invention recognize that when all of the available tape drives in a system are utilized for migration, there may not be a tape drive that can immediately respond to a recall operation request. Embodiments of the present invention also recognize that if a predetermined number of tape drives are placed in a standby state to respond to recall requests, the efficiency of use of the tape drives can be degraded. Embodiments of the present invention provide systems and methods for assigning files to be migrated to tape drives, such that the files are assigned based on the time of completion of migration of each tape drive, so that the migration of any one of the tape drives is completed within a predetermined period of time. In this way, it is possible to start a recall operation on one of the tape drives of a system within a predetermined period of time, regardless of when a recall operation request is received.

Figure 1:
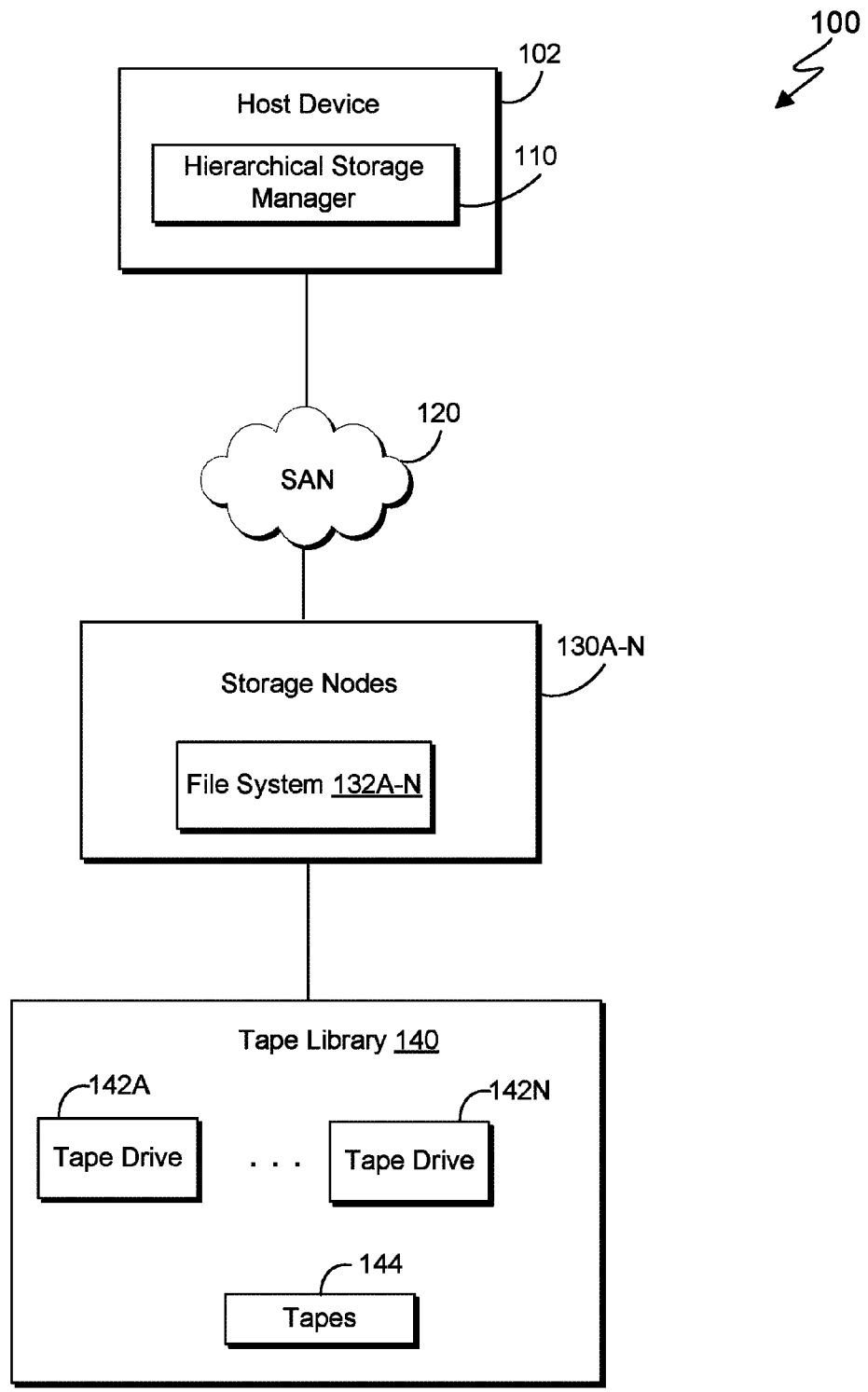
FIG. 1 depicts a hierarchical storage system, in accordance with an embodiment of the present invention.

The present invention will now be described in detail with reference to the Figures. FIG. 1 depicts a functional block diagram illustrating a hierarchical storage system, generally designated 100, in accordance with an embodiment of the present invention. Modifications to hierarchical storage system 100 may be made by those skilled in the art without departing from the scope of the invention as recited by the claims. In an exemplary embodiment, hierarchical storage system 100 includes host device 102, storage area network (SAN) 120, storage nodes 130A-N, and tape library 140.

Host device 102 may be a computing device, such as a laptop computer, a tablet computer, a netbook computer, a personal computer (PC), a desktop computer, a personal digital assistant (PDA), a smart phone, a thin client, or any programmable electronic device capable of communicating with tape library 140 via SAN 120. In other embodiments, host device 102 may be a management server, a web server, or any other electronic device or computing system capable of receiving and sending data. Host device 102 may include internal and external hardware components, as depicted and described in further detail with respect to FIG. 4. Host device 102 includes hierarchical storage manager 110.

Hierarchical storage manager 110 is a data storage software tool that is used to transparently move data between various types of storage media. Hierarchical storage manager 110 is designed to automate the migration and retrieval of data between expensive storage media, such as hard disk drives and low-cost media, such as optical disks and magnetic tapes. Hierarchical storage manager 110 can communicate with tape drives 142A-N and tapes 144 through a network, such as storage area network (SAN) 120. Hierarchical storage manager 110 may also communicate with one or more host systems through a host interface (not shown). In some embodiments, a host interface is operatively connected to SAN 120.

A file system component, file system 132A-N, is designed to work with hierarchical storage system 100, and is installed on each instance of storage nodes 130A-N, acting as the migration target for storage nodes 130A-N. File system 132A-N tracks the status of files stored in tape library 140 by hierarchical storage system 100 and accesses the recording space on tapes 144 through its file system interface, and handles the user data as file objects and associated metadata. File system 132A-N can be, for example, a linear tape file system (LTFS) and storage nodes 130A-N can be, for example, a general parallel files system (GPFS).

Tape library 140 includes tape drives 142A-N and tapes 144. Tape drives 142A-N can be any number and type of storage drives. In this exemplary embodiment, tape drives 142A-N are tape drives. Both tape library 140 and each of the tape drives 142A-N may comprise firmware of a processor, and a memory which is coupled to the processors, comprising instructions that, when executed by the processor, cause the process to perform various operations.

Tapes 144 can include one or more sequential access media, such as magnetic tape in tape drives 142A-N, optical media, and/or other storage device media. Data can be migrated from hard disk drives of storage nodes 130A-N to tapes 144, and can be recalled from tapes 144 to hard disk drives of storage nodes 130A-N, when requested.

Figure 2:
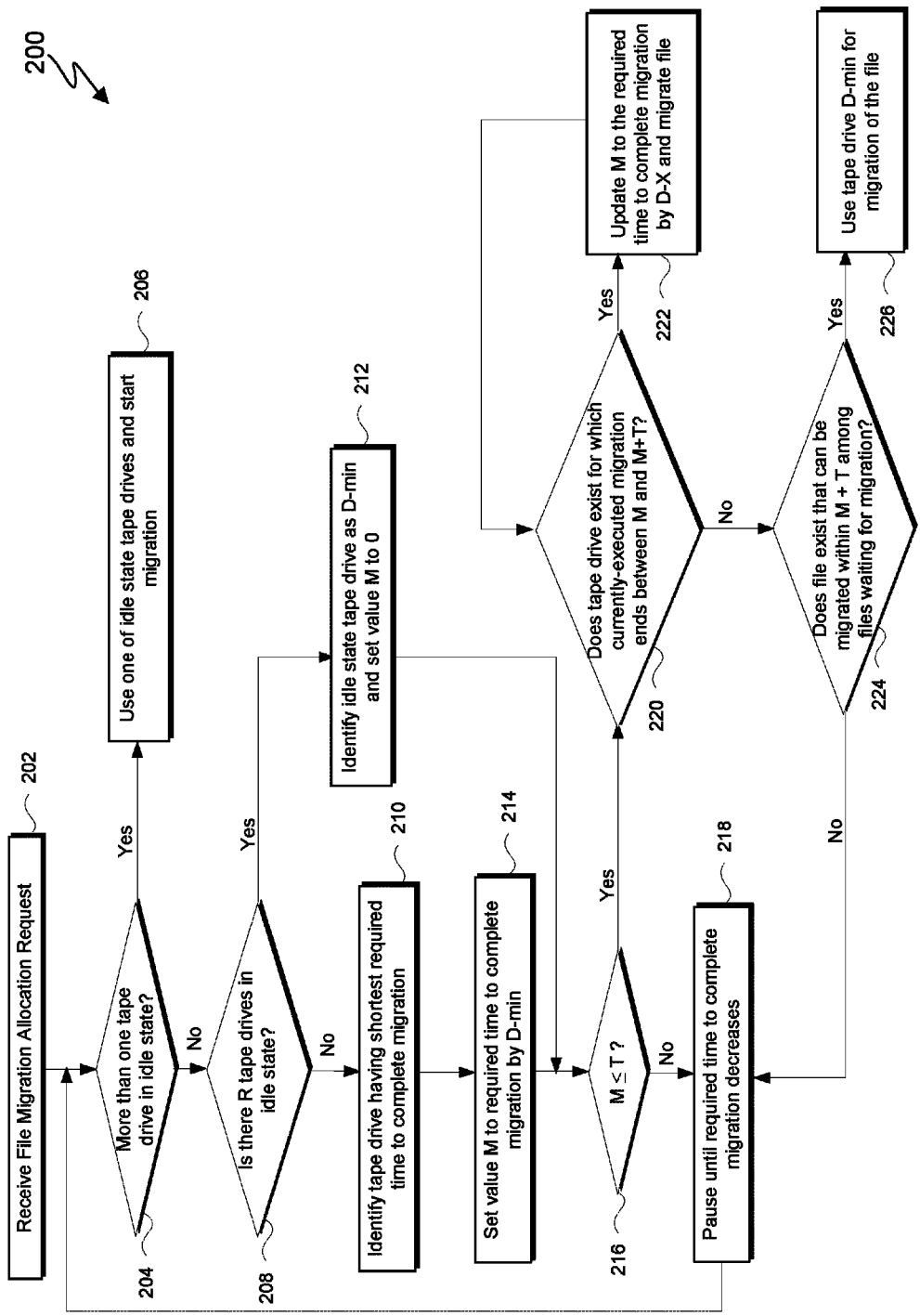
FIG. 2 depicts a flowchart illustrating operations for assigning files to tape drives for migration, in accordance with an embodiment of the present invention.

FIG. 2 depicts a flowchart illustrating operations for allocating files to tape drives for migration, in accordance with an embodiment of the present invention. In this embodiment, there exist N tape drives, and processing associated with at least R recall requests is to be started within a predetermined period of time, T.

Hierarchical storage manager 110 receives a file migration allocation request (operation 202). In one embodiment, an application running on a host system may request access to a data file that is not readily available, and file migration is initiated. For example, file system 132A-N migrates the content of some files on a hard disk, managed by storage nodes 130A-N, from the hard disk to a tape medium. Metadata associated with the files, including the file name, is retained on the hard disk, such that the available storage capacity is increased by putting the tape medium into the tape library and a user can use the system without a need to determine where the content of the file is currently being stored.

Hierarchical storage manager 110 determines whether there is more than one tape drive in the idle state (operation 204). A tape drive is in an idle state when it is not currently being used for a read or write operation.

If hierarchical storage manager 110 determines that there is more than one tape drive in the idle state, then hierarchical storage manager 110 selects one of the idle state tape drives and starts the file migration (operation 206). In a preferred embodiment, the file having the largest size among those files waiting for migration is selected for the migration. This ensures that where there are a greater number of tape drives in the idle state than recall requests (R), then migration of a file is started using one of the idle state tape drives.

If hierarchical storage manager 110 determines that there is not more than one tape drive in the idle state, then hierarchical storage manager 110 determines whether there are R number of tape drives in the idle state (operation 208). For example, if R=1, then hierarchical storage manager 110 determines whether that there is one tape drive in the idle state.

If hierarchical storage manager 110 determines that there are R tape drives in the idle state, then hierarchical storage manager 110 identifies the idle state tape drive as D-min and sets the value of M to zero (operation 212). In this embodiment, D-min is the tape drive having the shortest required time to complete file migration, and M is the required time to complete migration of D-min. Continuing with the above example, as one tape drive is determined to be in the idle state, that tape drive is used to perform the migration.

If hierarchical storage manager 110 determines that there are not R tape drives in the idle state, then hierarchical storage manager 110 identifies the tape drive, D-min, from all available (i.e., active) tape drives, having the shortest required time to complete migration (operation 210).

Hierarchical storage manager 110 sets the value M to the required time to complete migration by the identified, available tape drive, D-min (operation 214).

Hierarchical storage manager 110 determines whether the value of M is less than or equal to the value of T (operation 216). In this embodiment, hierarchical storage manager 110 determines whether the time required to complete a migration by D-min (M) is less than or equal to a predetermined period of time to start recall requests (T). Thus, hierarchical storage manager 110 waits to detect a tape drive whose utilization ends within T.

If hierarchical storage manager 110 determines that the value of M is not less than or equal to the value of T (i.e., the time required to complete a migration by D-min is greater than T), then hierarchical storage manager 110 pauses until the required time to complete the migration is decreased (operation 218). In one embodiment, hierarchical storage manager 110 pauses operations by automatically sleeping for one second, or another predetermined time period. In another embodiment, hierarchical storage manager 110 adjusts the sleep time based on the current values of M, T, and other parameters. After the predetermined pause time, hierarchical storage manager 110 checks to see if there is an idle tape drive(s) available (i.e., operation 204) to perform the file migration.

If hierarchical storage manager 110 determines that the value of M is less than or equal to the value of T (i.e., the time required to complete a migration by D-min is less than or equal to T), then hierarchical storage manager 110 determines whether a tape drive, denoted as D–X, exists for which a currently-executed migration ends after M and before M+T (operation 220). In this embodiment, hierarchical storage manager 110 performs a recursive search on all tape drives, to find a tape drive which ends after M and before M+T.

If hierarchical storage manager 110 determines that a tape drive, D–X, exists for which a currently-executed migration ends after M and before M+T, then hierarchical storage manager 110 updates the value of M to the required time to complete migration by the existing tape drive, D–X, and performs migration of the file (operation 222). In a preferred embodiment, the file with the largest size, satisfying the conditions of operation 220 is selected as the file to start migration.

If hierarchical storage manager 110 determines that no tape drive, D–X, exists for which a currently-executed migration ends after M and before M+T, then hierarchical storage manager 110 determines whether a file exists among the files waiting for migration, that can be migrated within M+T (operation 224). In one embodiment, hierarchical storage manager 110 determines whether a file exists whose migration is expected to be completed within a period of time that is obtained by adding T to the period of time, from the current time to the time at which utilization of the last found tape drive ends (M).

If hierarchical storage manager 110 determines that a file exists among the files waiting for migration that can be migrated within M+T, then hierarchical storage manager 110 uses tape drive D-min and performs migration of the file (operation 226). In one embodiment, hierarchical storage manager 110 selects the file having the largest size from among the files that can be migrated within M+T, among all the files waiting for migration, to perform the migration on tape drive D-min.

If hierarchical storage manager 110 determines that no file exists among the files waiting for migration that can be migrated within M+T, then hierarchical storage manager 110 pauses the operations until the required time to complete migration is decreased (operation 218), as described above.

Accordingly, by performing the operations of FIG. 2, it is possible to start a recall operation within a predetermined period of time, regardless of when the recall request is received. By allocating files to tape drives based on the time to complete migration of each tape drive, it can be guaranteed that the migration by any tape drive is completed within a predetermined period of time. Requested files during recall operations can be efficiently allocated to tape drives by using a tape drive which is in an idle status, if one exists. If there is not an idle tape drive, then the tape drive with the shortest required time to complete the migration (D-min) is used for the recall operation.

FIG. 3A depicts a schematic representation 300 of the order of files to be migrated by the tape drives, in accordance with an embodiment of the present invention.

In this example, there are three each of three files, whose time required for migration is 10 minutes, 20 minutes, and 30 minutes, respectively, where N=3, R=1, and T=10 minutes. Tape drives 302A-C are used to migrate the files, and the nine different files are denoted as: F10-1, F10-2, F10-3, F20-1, F20-2, F20-3, F30-1, F30-2, and F30-3.

The example files are assigned to tape drives 302A-C and according to the operations of FIG. 2, in the following order:
1. Start migration of F30-1 using tape drive 302A
2. Start migration of F30-2 using tape drive 302B
3. Start migration of F10-1 using tape drive 302C
4. Start migration of F10-2 using tape drive 302C
5. Start migration of F20-1 using tape drive 302C
6. Start migration of F20-2 using tape drive 302A
7. Start migration of F30-3 using tape drive 302B
8. Start migration of F20-3 using tape drive 302C
9. Start migration of F10-3 using tape drive 302A.

FIG. 3A depicts a diagram of the representation of the order of the files to be migrated by tape drives 302A-C. A migration job is assigned to a tape drive just before the tape drive starts a migration. As the priority of a recall operation is higher than the priority of a migration, the storage manager (e.g., hierarchical storage manager 110) prioritizes initiating the recall request before a migration. It should be appreciated that the migration performed by any of tape drives 302A-C is completed within T=10 minutes, regardless of when a recall request is received. For example, as depicted in FIG. 3A, at $T_0$, the migration of files begins on each of tape drives 302A-C. At $T_1$, migration of file F10-1 has completed, and tape drive 302C is available to perform a recall operation, if a recall request is received at any point between $T_0$ and $T_1$. At $T_2$, the migration of file F10-2 has completed, and tape drive 302C is available to perform a recall operation, if a request is received between $T_1$ and $T_2$. At $T_3$, files F30-1 and F30-2 have completed migration on tape drives 302A and 302B, respectively, and both of tape drives 302A and 302B are free to perform a recall operation, if a request is received between $T_2$ and $T_3$. At $T_4$, the migration of file F20-1 has completed, and tape drive 302C is available to perform a recall operation, if a recall request is received between $T_3$ and $T_4$. At $T_5$, the migration of file F20-2 has completed on tape drive 302A, and tape drive 302A is available to perform a recall operation, if a request is received between $T_4$ and $T_5$. Accordingly, a recall operation can be performed within a predetermined period of time, T, (i.e., 10 minutes in the present example), regardless of when a recall request is received, by effectively allocating the files to all of the available tape drives 302A-C.

FIG. 3B depicts a schematic representation 310 of the order of files to be migrated by the tape drives, in accordance with another embodiment of the present invention.

In this example, there are three each of three files, whose time required for migration is 5 minutes, 20 minutes, and 30 minutes, respectively, where N=3, R=1, and T=10 minutes. Tape drives 312A-C are used and the nine different files are denoted as: F5-1, F5-2, F5-3, F20-1, F20-2, F20-3, F30-1, F30-2, and F30-3.

The example files are assigned to tape drives 312A-C, according to the operations of FIG. 2, in the following order:
1. Start migration of F30-1 using tape drive 312A
2. Start migration of F30-2 using tape drive 312B
3. Start migration of F5-1 using tape drive 312C
4. Start migration of F5-2 using tape drive 312C
5. Start migration of F5-3 using tape drive 312C
6. Start migration of F20-1 using tape drive 312C
7. Start migration of F20-2 using tape drive 312A
8. Start migration of F30-3 using tape drive 312B
9. Start migration of F20-3 using tape drive 312C.

FIG. 3B depicts a diagram of the representation of the order of the files to be migrated by tape drives 312A-C. It should be appreciated that the migration performed by any of tape drives 312A-C is completed within T=10 minutes, regardless of when a request for a recall operation is received. For example, as depicted in FIG. 3B, at $T_0$, the migration of files begins on each of tape drives 312A-C. At $T_1$, migration of file F5-1 has completed, and tape drive 312C is available to perform a recall operation, if a recall request is received at any point between $T_0$ and $T_1$. At $T_2$, migration of file F5-2 has completed, and tape drive 312C is available to perform a recall operation, if a recall request is received at any point between $T_1$ and $T_2$. At $T_3$, migration of file F5-3 has completed, and tape drive 312C is available to perform a recall operation, if a recall request is received at any point between $T_2$ and $T_3$. It should be appreciated that after the completion of the migration of the file F5-3 using tape drive 312C (at $T_3$), both tape drives 312A and 312B require 15 more minutes to complete the migration of files F30-1 and F30-2, respectively. If tape drive 312C starts the migration of file F20-1 at $T_3$ (i.e., immediately after the completion of the migration of file F5-3), then there is no tape drive 312A-C which can start a recall operation within 10 minutes of $T_3$, without interrupting a currently-executed migration. Thus, an intentional 5 minute gap is inserted after the migration of file F5-3, and before the start of the migration of file F20-1 (at $T_4$), in order to ensure that at least one tape drive (i.e., tape drive 312C) is available to perform a recall operation within 10 minutes, if a recall operation is received between $T_3$ and $T_4$. At $T_4$, file F20-1 begins migration on tape drive 312C (after the 5 minute time gap where tape drive 312C was not used), and at $T_5$, the migration of files F30-1 and F30-2 has completed on tape drives 312A and 312B, respectively, and both of tape drives 312A and 312B are free to perform a recall operation, if a request is received between $T_4$ and $T_5$. At $T_6$, the migration of file F20-1 has completed, and tape drive 312C is available to perform a recall operation, if a recall request is received between $T_5$ and $T_6$.

Accordingly, a recall operation can be performed within a predetermined period of time, T, (i.e., 10 minutes in the present example), regardless of when a recall request is received, by effectively allocating the files to all of the available tape drives 312A-C and intentionally ensuring that tape drive 312C is not utilized for 5 minutes between $T_3$ and $T_4$.

Figure 4:
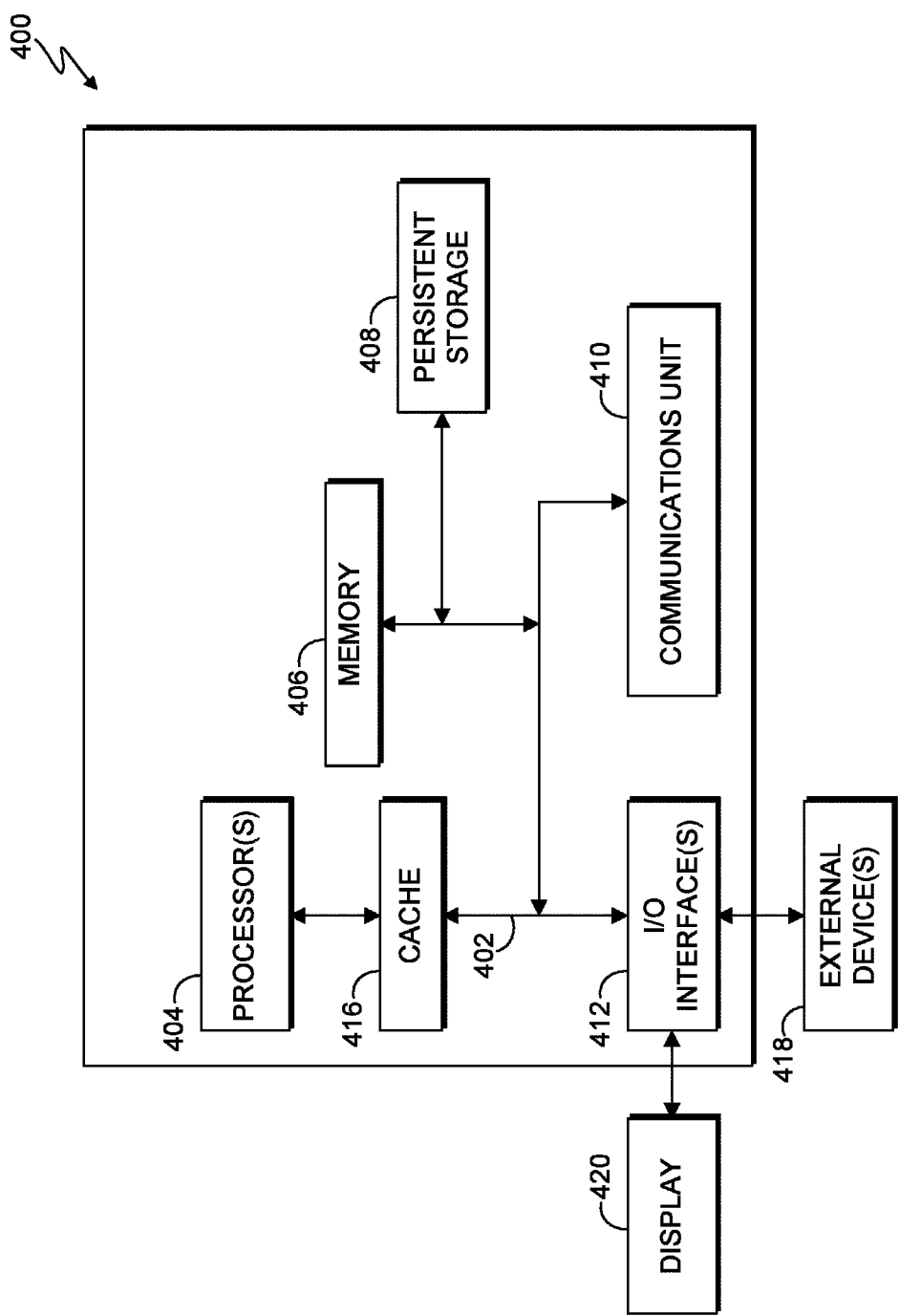
FIG. 4 depicts a block diagram of components of a computing device, in accordance with an illustrative embodiment of the present invention.

FIG. 4 is a block diagram of internal and external components of a computing device, generally designated 400, which is representative of the computing devices of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between computer processor(s) 404, memory 406, cache 416, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of a network. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to computing device 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more computer processors, a recall request (R), wherein R is greater than or equal to one;
   determining, by the one or more computer processors, whether a number of recall requests (R) is less than a number of storage drives that are in an idle state;
   responsive to determining that the number of recall requests (R) is not less than the number of storage drives that are in the idle state, determining, by the one or more computer processors, whether the number of storage drives that are in the idle state is equal to the number of recall requests (R); and
   responsive to determining that the number of storage drives that are in the idle state is equal to the number of recall requests (R), identifying, by the one or more computer processors, a storage drive that is in the idle state as the storage drive comprising a shortest time to complete a requested recall operation and setting a time to complete the requested recall operation (M) of the identified storage drive to zero.

2. The method of claim 1, further comprising:
   responsive to determining that the number of recall requests (R) is less than the number of storage drives that are in the idle state, selecting, by the one or more computer processors, a storage drive that is in the idle state to perform the requested recall operation.

3. The method of claim 1, further comprising:
determining, by the one or more computer processors, whether the time to complete the requested recall operation (M) of the identified storage drive is less than or equal to a threshold time (T), wherein the threshold time (T) is a predetermined period of time in which to start the requested recall operation.

4. The method of claim 3, further comprising:
responsive to determining that the time to complete the requested recall operation (M) of the identified storage drive is not less than or equal to the threshold time (T), pausing, by the one or more computer processors, for a predetermined pause time, until an idle storage drive, of the plurality of storage drives, is available.

5. The method of claim 3, further comprising:
responsive to determining that the time to complete the requested recall operation (M) of the identified storage drive is less than or equal to the threshold time (T), determining, by the one or more computer processors, whether a current migration on a storage drive ends between the time to complete the requested recall operation (M) and the threshold time (T).

6. The method of claim 5, further comprising:
responsive to determining that the current migration on the storage drive does not end between the time to complete the requested recall operation (M) and the threshold time (T), identifying, by the one or more computer processors, a file to migrate on the storage drive, with a migration time which ends between the time to complete the requested recall operation (M) and the threshold time (T).

7. The method of claim 1, further comprising:
responsive to determining that the number of recall requests (R) is not less than the number of storage drives that are in the idle state, determining, by the one or more computer processors, whether the number of storage drives in the idle state is equal to the number of recall requests (R); and
responsive to determining that the number of storage drives in the idle state is not equal to the number of recall requests (R), identifying, by one or more computer processors, a storage drive in an active state having a shortest time to complete the requested recall operation and assigning the shortest time to complete the requested recall operation (M) to the identified storage drive in the active state.

8. The method of claim 1, wherein a file with a largest size from a set of files waiting for a migration is selected for the requested recall operation.

9. A computer program product comprising:
one or more computer readable storage media and program instructions stored on the one or more computer readable storage media, the program instructions comprising:
program instructions to receive a recall request (R), wherein R is greater than or equal to one;
program instructions to determine whether a number of recall requests (R) is less than a number of storage drives that are in an idle state;
program instructions to, responsive to determining that the number of recall requests (R) is not less than the number of storage drives that are in the idle state, determine whether the number of storage drives that are in the idle state is equal to the number of recall requests (R); and program instructions to, responsive to determining that the number of storage drives that are in the idle state is equal to the number of recall requests (R), identify a storage drive that is in the idle state as the storage drive comprising a shortest time to complete a requested recall operation and setting a time to complete the requested recall operation (M) of the identified storage drive to zero.

10. The computer program product of claim 9, further comprising:
program instructions to, responsive to determining that the number of recall requests is less than the number of storage drives that are in the idle state, select a storage drive that is in the idle state to perform the requested recall operation.

11. The computer program product of claim 9, further comprising:
program instructions to determine whether the time to complete the requested recall operation (M) of the identified storage drive is less than or equal to a threshold time (T), wherein the threshold time (T) is a predetermined period of time in which to start the requested recall operation.

12. The computer program product of claim 11, further comprising:
program instructions to, responsive to determining that the time to complete the requested recall operation of the identified storage drive is not less than or equal to the threshold time, pause for a predetermined pause time, until an idle tape storage is available.

13. The computer program product of claim 11, further comprising:
program instructions to, responsive to determining that the time to complete the requested recall operation (M) of the identified storage drive is less than or equal to the threshold time (T), determine whether a current migration on a storage drive ends between the time to complete the requested recall operation (M) and the threshold time (T).

14. The computer program product of claim 13, further comprising:
program instructions to identify a file to migrate on the storage drive, with a migration time which ends between the time to complete the requested recall operation (M) and the threshold time (T).

15. A computer system comprising:
one or more computer processors;
one or more computer readable storage media;
program instructions stored on the computer readable storage media for execution by at least one of the one or more processors, the program instructions comprising:
program instructions to receive a recall request (R), wherein R is greater than or equal to one;
program instructions to determine whether a number of recall requests (R) is less than a number of storage drives that are in an idle state;
program instructions to, responsive to determining that the number of recall requests (R) is not less than the number of storage drives that are in the idle state, determine whether the number of storage drives that are in the idle state is equal to the number of recall requests (R); and
program instructions to, responsive to determining that the number of storage drives that are in the idle state is equal to the number of recall requests (R), identify a storage drive that is in the idle state as the storage drive comprising a shortest time to complete a requested recall operation and setting a time to complete the requested recall operation (M) of the identified storage drive to zero.

16. The computer system of claim 15, further comprising: program instructions to, responsive to determining that the number of recall requests (R) is less than the number of storage drives that are in the idle state, select a storage drive that is in the idle state to perform the requested recall operation.

17. The computer system of claim 15, further comprising: program instructions to determine whether the time to complete the requested recall operation (M) of the identified storage drive is less than or equal to a threshold time (T), wherein the threshold time (T) is a predetermined period of time in which to start the requested recall operation.

18. The computer system of claim 17, further comprising: program instructions to, responsive to determining that the time to complete the requested recall operation (M) of the identified storage drive is not less than or equal to the threshold time (T), pause for a predetermined pause time, until an idle storage drive is available.

19. The computer system of claim 17, further comprising: program instructions to, responsive to determining that the time to complete the requested recall operation (M) of the identified storage drive is less than or equal to the threshold time (T), determine whether a current migration on a storage drive ends between the time to complete the requested recall operation (M) and the threshold time (T).

20. The computer system of claim 19, further comprising: program instructions to, responsive to determining that the current migration on the storage drive does not end between the time to complete the requested recall operation (M) and the threshold time (T), identify a file to migrate on the storage drive, with a migration time which ends between the time to complete the requested recall operation (M) and the threshold time (T).

* * * * *